W. H. HORNUM.

Assignor by mesne assignments to The Hornum Patent Fare-Register Manufacturing Co.

FARE-REGISTER.

No. 7,554. Reissued March 13, 1877.

Witnesses.

Otis Shufeldt.

Chas. L. Coombs.

Inventor

William H. Hornum by

Van Santvoord & Hauff his attorneys.

UNITED STATES PATENT OFFICE.

WILLIAM H. HORNUM, OF NEW YORK, N. Y., ASSIGNOR, BY MESNE ASSIGNMENTS, TO THE HORNUM PATENT FARE REGISTER MANUFACTURING COMPANY, OF SAME PLACE.

IMPROVEMENT IN FARE-REGISTERS.

Specification forming part of Letters Patent No. 165,832, dated July 20, 1875; reissue No. 6,946, dated February 22, 1876; reissue No. 7,554, dated March 13, 1877; application filed March 7, 1877.

*To all whom it may concern:*

Be it known that I, WILLIAM H. HORNUM, of the city, county, and State of New York, have invented a new and useful Improvement in Fare-Registers, which improvement is fully set forth in the following specification, reference being had to the accompanying drawing, in which—

Figure 1:
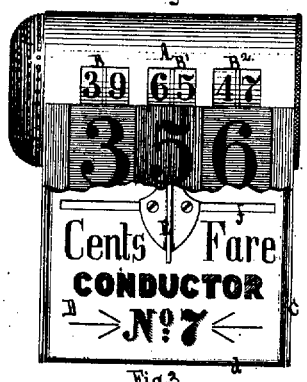
Figure 2:
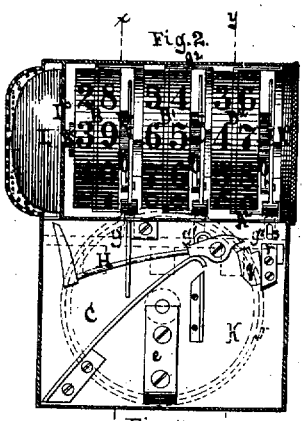
Figure 3:
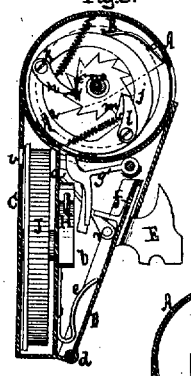
Figure 4:
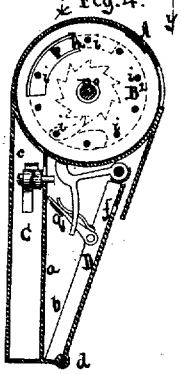
Figure 5:
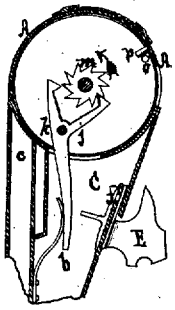

Figure 1 represents a face view, some portions being broken away to expose the working parts. Fig. 2 is a longitudinal section. Fig. 3 is a transverse section in the plane *x x*, Fig. 2. Fig. 4 is a similar section in the plane *y y*, Fig. 2. Fig. 5 is a transverse section of a modification of the same.

Similar letters indicate corresponding parts.

This invention consists in the combination of a switch with two or more registering-levers, each of which acts on a distinct set of registering-wheels, and with a main lever or prime mover, so that by moving the switch one and the same prime mover serves to actuate different sets of registering-wheels. With the switch, the prime mover, the registering-levers, and the registering-wheels are combined a hammer and a bell, so that whenever the prime mover is actuated and a fare is registered on either of the registering-wheels, the bell is sounded. With the switch, the prime mover, and the single-trip-registering devices is combined a general registering mechanism, which continues to add up all the fares registered by the single-trip-registering devices during a long period of time, and which remains undisturbed, while the single-trip-registering devices are returned to zero after each trip. The single-trip registering-wheels, together with their actuating-anchors and ratchet-wheels, are secured to a shaft which is fast to a head that fits the case inclosing said registering-wheels, so that by removing said head the registering-wheels, with their actuating-anchors and ratchet-wheels, are withdrawn, and another set of registering-wheels can be readily substituted. With the general registering device and the single-trip register are combined a zero-guard and a pawl and ratchet, so that the single-trip register can be set back to zero; but it cannot be moved forward independent of its actuating mechanism.

In the drawing, the letter A designates a cylindrical case, which contains two or more sets of registering-wheels, B $B^1$ $B^2$, and a gong or bell, I, said gong being fastened to a bridge or partition, $I^0$, which is secured in the cylindrical case A, and which forms the bearings for the inner end of the shaft $B^0$, on which are mounted the registering wheels or drums B $B^1$ $B^2$. The outer end of said shaft is secured in a head or cover, $A^0$, that fits the open end of the cylindrical case A. By this arrangement I am enabled to remove the entire registering mechanism from the case A simply by withdrawing the head or cover $A^0$, and another registering mechanism of the same or of a different nature can be substituted therefor. At the end of each round-trip of a street-car, for instance, the conductor hands his register to the proper clerk, who removes the registering mechanism and substitutes another for it, so that the conductor is not detained, while the clerk at his leisure enters the amount of the fares indicated by the registering mechanism retained by him, and then sets the several registering-wheels to the zero-point. On the head $A^0$ is secured an inner cylinder, $A^2$, which fits the case A and incloses the registering-wheels.

With the case A is combined another case, C, that is divided by a partition, *a*, in two compartments, *b c*. The front plate D is connected to the body of the case by a hinge-joint, *d*, and a spring, *e*, has a tendency to force said front plate out to the position shown in Figs. 3 and 4. In this front plate is a slot, *f*, which forms the guide for a switch, E, and beneath said front plate are two or more levers, *g* $g^1$ $g^2$, each of which serves to actuate one of the sets of registering-drums B $B^1$ $B^2$. Each set of registering-drums consists of a unit-drum and a ten-drum, the unit-drum being provided with a spring-pawl, *h*, Fig. 4, which, whenever said unit-drum has completed nine-tenths of a revolution, engages with one of ten pins, *i*, projecting from the side of the ten-drum, and as the unit-drum completes the last tenth of its revolution the ten-drum is moved with it.

The mechanism for propelling the registering-drums, as shown in Fig. 3, consists of an anchor, *j*, which swings on a pivot, *k*, and carries a spring-pawl, *l*, that engages with a ratchet-wheel, *m*, secured to the unit-drum, said ratchet-wheel being provided with ten teeth, so that each time the appropriate lever *g*, $g^1$, or $g^2$ is actuated the corresponding unit-drum is propelled one-tenth of a revolution. A stop-pawl, *n*, prevents said unit-drum from moving backward. The pivots *k* of the anchors *j* are secured in partition-plates, which are fastened to the shaft $B^6$, so that when this shaft, together with the cover $A^0$, is withdrawn, the entire registering mechanism follows, as heretofore stated.

On the face of each of the registering-drums are marked the figures 0 to 9, and consequently each set of registering-drums is capable of registering ninety-nine fares.

In the mechanism shown in Fig. 3 the levers *g* $g^1$ $g^2$ are detached from the anchor *j l*; but, if desired, the levers *g* $g^1$ $g^2$ may be made in one piece with their anchors *j*, as shown in Fig. 5. By referring to Fig. 3, it will be seen that the registering-drum, when propelled by the anchor *j l*, turns in the direction of the arrow marked on the ratchet-wheel *m* in said figure, and no provision is made to prevent the conductor from turning the drum forward by hand. If the conductor desires to cheat his employers, he can turn the registering-drums forward until both the unit and the ten drums are on the zero-point, and then he can turn the drums farther to any desired point; for instance, if he has received on a certain trip fifty fares, he can set his drums to show thirty or any other number smaller than fifty, and pocket the difference. This difficulty is avoided by the mechanism shown in Fig. 5. In this case the forward motion of the registering-drums takes place in the direction of the arrow shown in that figure, and said drums cannot be moved forward by hand, being prevented by the ratchet-wheel *m* and the pawl or pallet of the anchor *j*; but each set of registering-drums can be turned backward until caught by a stop, *o*, secured to one of the drums, and by a lug, *p*, fastened to the case A, said stop and lug being in such a position that they arrest the drum at the zero-point. At the beginning of the trip the registering-drums are set to zero by the superintendent, and then the fare-register is handed to the conductor. He cannot at that time move the registering-drums by hand in either direction, and as soon as he begins to register fares by depressing the front plate D he also actuates a general registering mechanism, which will be presently described, and if the registering-drums should be set back during the trip, the general register will expose the fraud. If it were not for the zero-stop, however, the conductor, after receiving the fare-register from the superintendent, could turn the unit-drum backward, so as to indicate, for instance, eight fares instead of zero, and, by neglecting to register eight fares during the trip and turning the registering-drum back again at the end of the trip, so as to make them correspond to the general register, he could defraud his employers.

The switch E can be moved over either of the levers *g* $g^1$ $g^2$, and if the front plate D, which forms the prime mover, is then depressed, the switch acts on the lever beneath it, and the corresponding registering mechanism B, $B^1$, or $B^2$ is propelled one step. One of the registering mechanisms is intended for three-cent fares, one for five-cent fares, and one for six-cent fares, and, if desired, still more registering mechanisms may be added for fares of other amounts.

On the front plate D is secured a compound pawl, *q r*, and if said front plate is depressed the arm *q* of said pawl acts on the tail end of the hammer H, so as to cause the same to strike the bell I. The arm *r* of said compound pawl acts on a pin, *s*, which projects from a lever, *t*, situated in the lower compartment *c* of the case C. This lever carries a spring-pawl, *u*, that engages with teeth cut in the periphery of a ring, J, that embraces a disk, K. The ring J and the disk K form the general registering mechanism. Said ring is provided on its face with figures from 1 to 100, and the disk K bears on its face one hundred radial marks and figures, beginning with 1 and running from 5 to 5, the ring being connected to the disk in such a manner that for each complete revolution of the ring the disk is caused to move one-hundredth part of a revolution, and thus, by means of this general registering mechanism, ten thousand passengers can be registered. The figures and the marks of the ring and disk can be seen through an aperture, *v*, in the back plate of the case C; and since this general registering device will be moved invariably one step for each motion of the prime mover D, the number indicated by it must tally with the sum of the numbers indicated by the single-trip-registering devices B $B^1$ $B^2$. At the end of each trip the single-trip-registering devices are set back to zero, while the general registering mechanism remains undisturbed, and continues to add up all the fares taken during a long period of time.

The conductor of a railroad car or train fastens my fare-register in a convenient position on his person, and on receiving a fare he moves the switch to the appropriate lever, and then he depresses the front plate. This operation he can easily perform with one hand, and the number and amount of fares received can be read off at the end of each trip.

What I claim as new, and desire to secure by Letters Patent, is—

1. The combination of a switch, E, with a prime mover, D, and with two or more levers, $g\ g^1\ g^2$, and corresponding registering devices $B\ B^1\ B^2$, substantially as shown and described.

2. The combination of a switch, E, prime mover D, the registering devices $B\ B^1\ B^2$, (one or more,) and a bell and hammer or other alarm, substantially as and for the purpose set forth.

3. The combination, in a passenger-register, of the switch E, the prime mover D, the registering devices $B\ B^1\ B^2$, (one or more,) and a general registering device, J K, substantially as and for the purpose described.

4. The combination, in a passenger-register, of the set of indicator-wheels B, adjustable for each day or trip, the inaccessible general register J K, the prime mover for operating the two sets of registers simultaneously but independently, through connections substantially such as herein shown and described.

5. The combination, in a passenger-register, of a general registering device and a single-trip-registering device, with a shaft secured in a head which fits the end of the case inclosing the single-trip registering device, so that by removing said head the single-trip-registering device can be withdrawn and another substituted for it without disturbing the general register, substantially as set forth.

6. The combination, in a passenger register or indicator, of a general register, a single-trip register, adapted to be set back to zero at will, actuating mechanism common to all, and a pawl and ratchet to prevent the forward movement of the single-trip register independently of the actuating mechanism, substantially as and for the purpose described.

7. The combination, with the single-trip register, and with a pawl and ratchet which prevents its forward movement independently of the actuating mechanism, of a zero-guard, substantially as and for the purpose set forth.

In testimony that I claim the foregoing I have hereunto set my hand and seal this 26th day of February, 1877.

WILLIAM H. HORNUM. [L. S.]

Witnesses:
W. HAUFF,
CHAS. WAHLERS.